Patented Feb. 14, 1939

2,146,989

UNITED STATES PATENT OFFICE 2,146,989

BARBITURIC ACID COMPOUNDS

Paul Rosengart, Lugano-Massagno, Switzerland, and Erich Rabald, Mannheim, Germany, assignors to Pola Fabricca Di Prodotti Chimici S. A., Melano, (Ticino) Switzerland, a jointstock company of Switzerland No Drawing. Application November 26, 1937, Serial No. 176,640. In Germany July 22, 1936

10 Claims. (Cl. 260—258)

Our invention relates to new chemical compounds possessing valuable therapeutic properties and acting more especially as soporifics. The invention also includes the process of producing these compounds.

The new compounds according to our invention are obtained when a barbituric acid substituted in 5-position, as represented by the following formula

wherein $R_1$ and $R_2$ are similar or dissimilar radicals, is combined with a calcium or a magnesium salt of a bile acid, i. e. a carbocyclic acid being an oxygen derivative, and containing the skeleton of cyclopentanophenanthrene, thus being one of the well known oxygen derivatives of Wieland's "cholan (carbonic) acid" (Zeitschr. f. physik. Chemie 106, 108, 110), as represented by the formula:

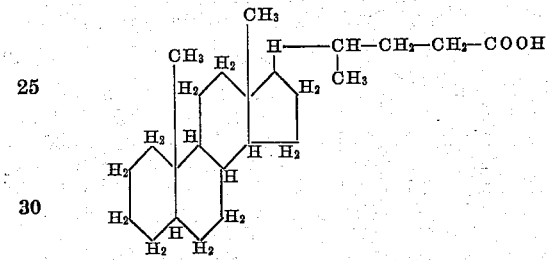

We have found that the new valuable compounds can be obtained in a particularly simple manner if calcium oxide or magnesium oxide is caused to act in aqueous surroundings on a mixture of two acids of the types aforementioned. In producing these compounds we may for instance proceed as follows:

Example 1.—4.64 parts (by weight) phenylethyl barbituric acid

are mixed with 8.04 parts dehydrocholic acid

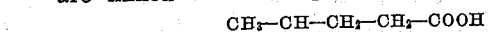

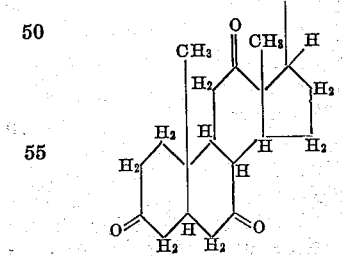

and 1.12 parts calcium oxide of highest purity and the mixture is entered in 200 parts distilled water to be heated therein 1 hour to 30° C. and to thereafter stand at ordinary temperature for 24 hours, whereupon the liquid is evaporated in a vacuum.

The salt obtained after evaporation sinters between 245 and 290° C. under foaming and decomposition. It is assumed to have the formula

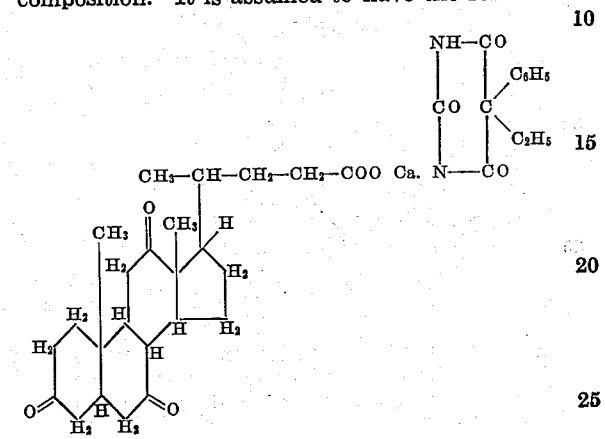

Example 2.—0.468 part N-methyl-C, C-cyclohexenylmethyl barbituric acid

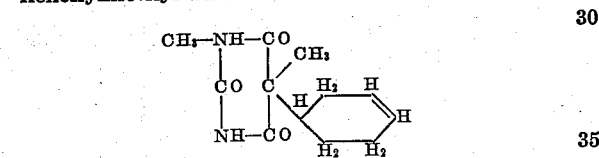

0.748 part oxycholenic acid

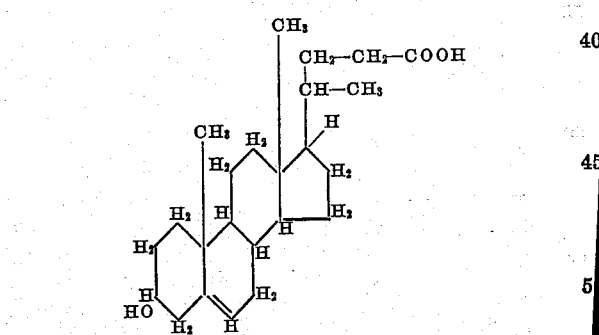

and 0.112 part CaO of highest purity are shaken ½ hour at room temperature with 30 parts water, whereupon the mixture is allowed to stand 12 hours, evaporated in vacuo and the residue dried in the presence of phosphorus pentoxide.

The salt thus obtained is directly suitable for therapeutic use. It is assumed to have the formula.

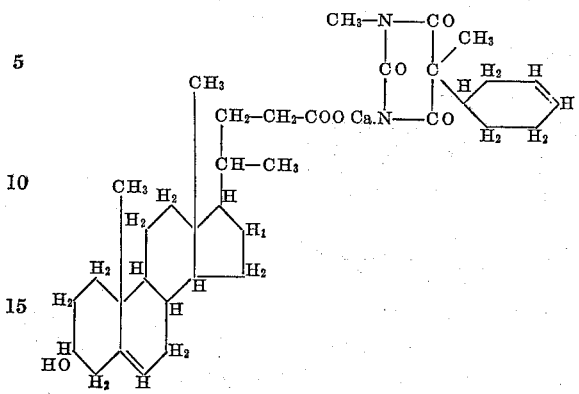

Example 3.—A mixture of 0.92 part diethyl barbituric acid $$\begin{array}{c} NH-CO \\ | \quad | \\ CO \quad C(C_2H_5)_2 \\ | \quad | \\ NH-CO \end{array}$$

2.01 parts dehydrocholic acid

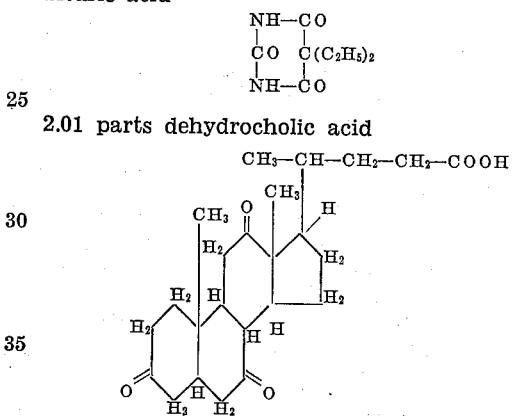

and 0.20 part MgO are shaken two hours at room temperature in about 300 parts water, whereupon the solution is evaporated to dryness in vacuo at about 50° C.

The residual salt is a white crystalline powder and is assumed to have the formula:

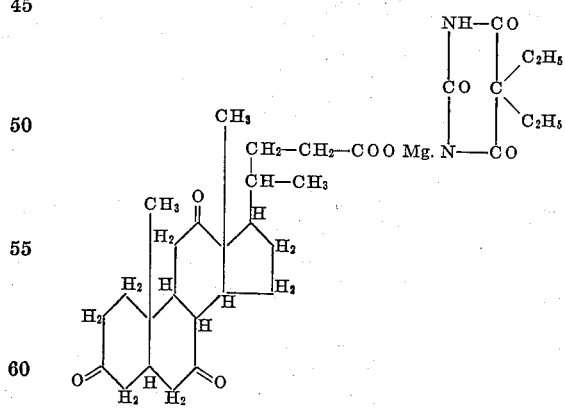

We believe the new products to be not mere mixtures of two salts, but double salts of the two acids reacted with each other, but we wish to make it clear that this is a mere assumption, which is based for instance on the fact that if the double compound calcium phenylethylbarbiturate, calcium dehydrocholate, which we assume to be represented by the formula indicated in Example 1, is dissolved in a quantity of water insufficient to effect complete solution, the percentage of calcium in the dissolved part is exactly the same as in the non-dissolved residue, viz. 6%, which is also the percentage of calcium calculated for the double salt. If the product were nothing but a mechanical mixture of calcium phenylethylbarbiturate and calcium dehydrocholate, the percentage of calcium in the solution would of necessity be much greater, since the component calcium phenylethylbarbiturate, 2 parts of which dissolve in 100 parts water, contains 7.1% Ca, while the component calcium dehydrocholate, only 0.5 part of which dissolves in 100 parts water, contains only 4.7% CaO.

The new compounds act as soporifics similarly as the free barbituric acids substituted in 5-position, but the quantities required for a satisfactory action are far less than correspond to the quantity of substituted barbituric acid contained in the double compound and may be as one tenth of the quantity of free substituted barbituric acid required to obtain the same effect, as ascertained by medical treatment of human patients.

The new compounds further offer the advantage, as compared with the free substituted barbituric acids, or possessing a considerably larger therapeutical range. Thus for instance the efficacious dose of the free phenylethylbarbituric acid, as compared to the lethal dose, is 75:100. In the double calcium salt of the same acid with dehydrocholic acid it is 60:100, so that the therapeutical range of the new double compound is higher by approximately 25 per cent.

In investigating the therapeutical effect of the new compounds, we have made, amongst others, the following tests:

White mice were treated—
A. With calcium phenylethylbarbiturate;
B. With the double salt of calcium phenylethylbarbiturate-calciumbromide;
C. With the double compound calcium phenylethylbarbiturate-calcium dehydrocholate.

When quantities of the compounds A and B were administered corresponding to 172.5 milligrams phenylethyl barbituric acid per 1000 grams of test animals, all animals died, while, when compound C was administered in a quantity corresponding to the same amount of phenylethyl barbituric acid, 70% of the animals survived. On the other hand, when quantities of compound A were administered corresponding only to 103.5 milligrams phenylethyl barbituric acid, only 30% of the test animals survived, while 100% survived, when compound C was administered in a quantity which contained the same amount of phenylethyl barbituric acid. A similar test with compound B could not be made, since no soporific effect was obtained.

Investigation into the toxicity and efficacy of the new compounds, as compared with known compounds of barbituric acids furnished the following results.

When to 20 white mice, each weighing about 20 grams, 700 milligrams of N-methyl-C, C-cyclohexenylmethylbarbituric acid

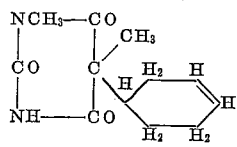

were administered per kg. of test animals, all the animals thus treated died when the calcium bromide compound was used. In contradistinction thereto, if the same dose of N-methylcyclohexenyl-methylbarbituric acid in the form of its calcium double salt with dehydrocholic acid

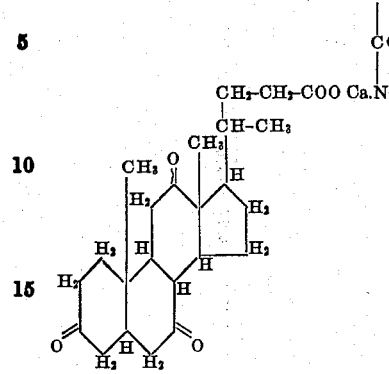

was administered, 13 out of 20 animals survived.

When the dose was reduced to 500 milligrams, 12 out of 20 mice treated with the calcium bromide compound died, while all animals treated with the calcium double salt of the two acids mentioned in the preceding paragraph survived.

The minimum hypnotic dose of N-methyl-C,C-cyclohexenylmethylbarbituric acid is about 120 milligrams per kg. mice. With mice the same dose is effective also with the calcium double salt mentioned above. These comparative tests thus show that the new compounds according to this invention are as effective soporifics for animals as the corresponding free barbituric acid, but that their toxicity is a far lower one. The hypnotic dose for men is much smaller than for mice and, as shown by the above mentioned clinical tests, considerably smaller with our new compounds than with the free acid.

Various changes may be made in the details disclosed in the foregoing specification without departing from the invention or sacrificing the advantages thereof.

We claim:—

1. Compounds which are the reaction products of a bile acid, a barbituric acid substituted in the 5-position and a base of the class consisting of oxides of calcium and magnesium, these compounds being as efficacious soporifics as the corresponding substituted barbituric acids, but less toxic.

2. Compounds which are the reaction products of dehydrocholic acid, a barbituric acid substituted in the 5-position and a base of the class consisting of oxides of calcium and magnesium, these compounds being as efficacious soporifics as the corresponding substituted barbituric acids, but less toxic.

3. Compounds which are the reaction products of oxycholenic acid, a barbituric acid substituted in the 5-position and a base of the class consisting of oxides of calcium and magnesium, these compounds being as efficacious soporifics as the corresponding substituted barbituric acids, but less toxic.

4. Compounds which are the reaction products of a bile acid, phenylethyl (5) barbituric acid and a base of the class consisting of oxides of calcium and magnesium, these compounds being as efficacious soporifics as the corresponding substituted barbituric acids, but less toxic.

5. Compounds which are the reaction products of a bile acid, diethyl (5) barbituric acid and a base of the class consisting of oxides of calcium and magnesium, these compounds being as efficacious soporifics as the corresponding substituted barbituric acids, but less toxic.

6. Compounds which are the reaction products of dehydrocholic acid, phenylethyl (5) barbituric acid and a base of the class consisting of oxides of calcium and magnesium, these compounds being as efficacious soporifics as the corresponding substituted barbituric acids, but less toxic.

7. Compounds which are the reaction products of dehydrocholic acid, diethyl (5) barbituric acid and a base of the class consisting of oxides of calcium and magnesium, these compounds being as efficacious soporifics as the corresponding substituted barbituric acids, but less toxic.

8. Compounds which are the reaction products of oxycholenic acid, N-methyl-C,C-cyclohexenylmethyl (5) barbituric acid and a base of the class consisting of oxides of calcium and magnesium, these compounds being as efficacious soporifics as the corresponding substituted barbituric acids, but less toxic.

9. Compounds which are the reaction products of a bile acid, N-methyl-C,C-cyclohexenylmethyl (5) barbituric acid and a base of the class consisting of oxides of calcium and magnesium, these compounds being as efficacious soporifics as the corresponding substituted barbituric acids, but less toxic.

10. The process of producing reaction products of a bile acid, a barbituric acid substituted in the 5-position and a base of the class consisting of oxides of calcium and magnesium, which comprises acting on a mixture of such acids in water with one of said metal oxides.

PAUL ROSENGART.
ERICH RABALD.